Dec. 9, 1924.

C. J. OLSON

ROTARY ENGINE

Filed Dec. 7, 1922

Inventor
Charles J. Olson
By
Lacey & Lacey, Attorneys

Dec. 9, 1924.
C. J. OLSON
1,518,812
ROTARY ENGINE
Filed Dec. 7, 1922
7 Sheets-Sheet 2
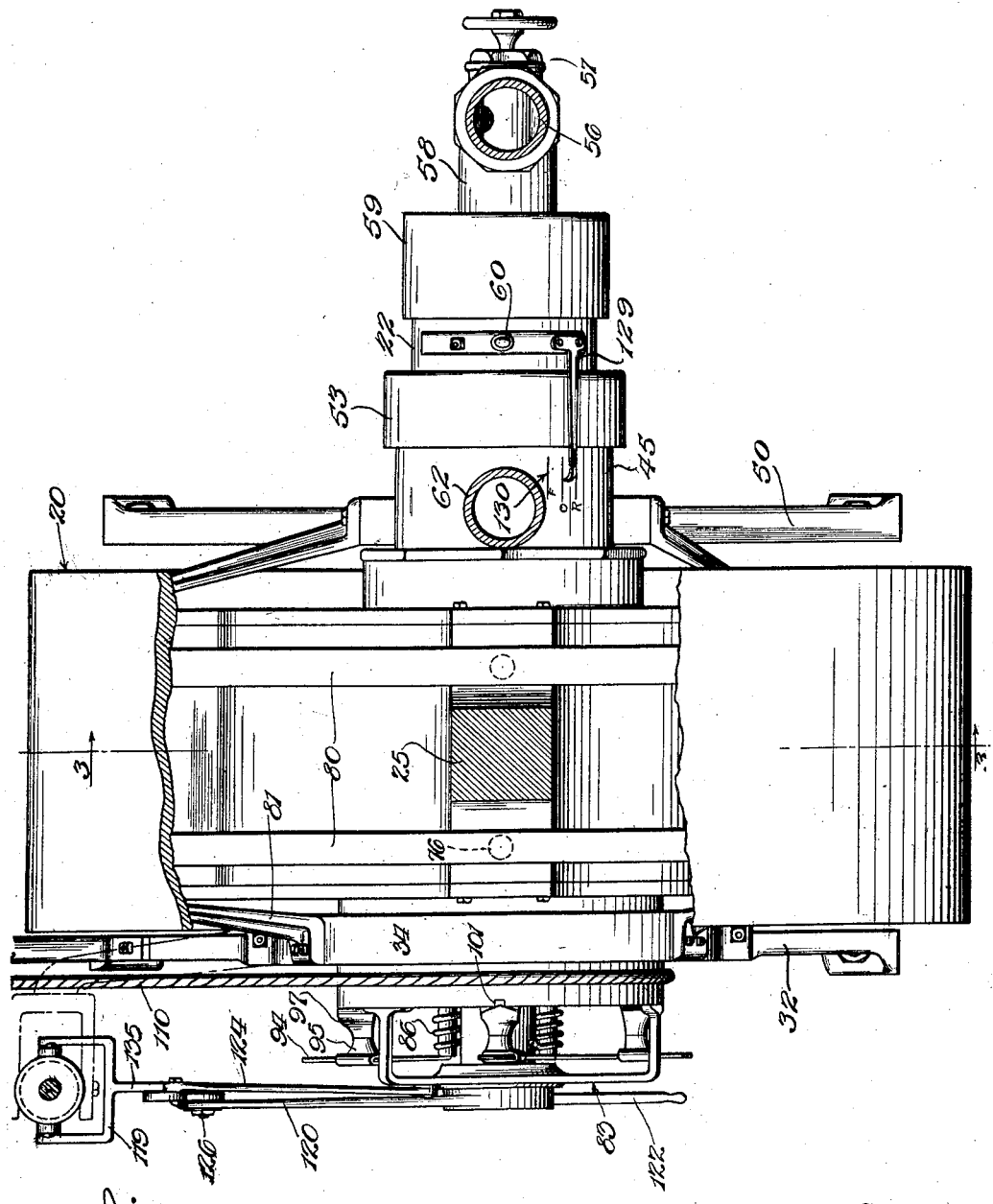
Inventor
Charles J. Olson
By
Lacy & Lacy, Attorney

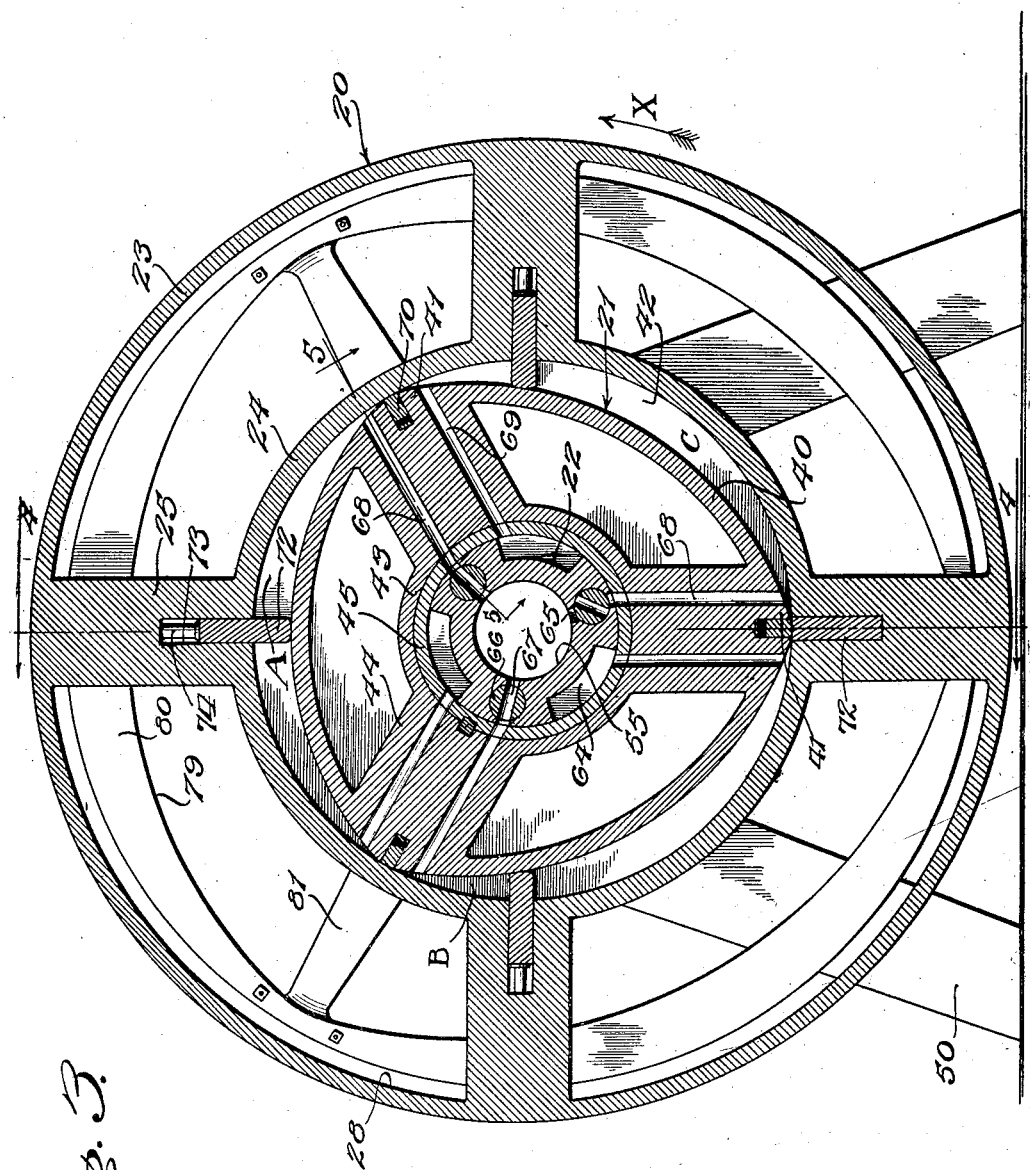

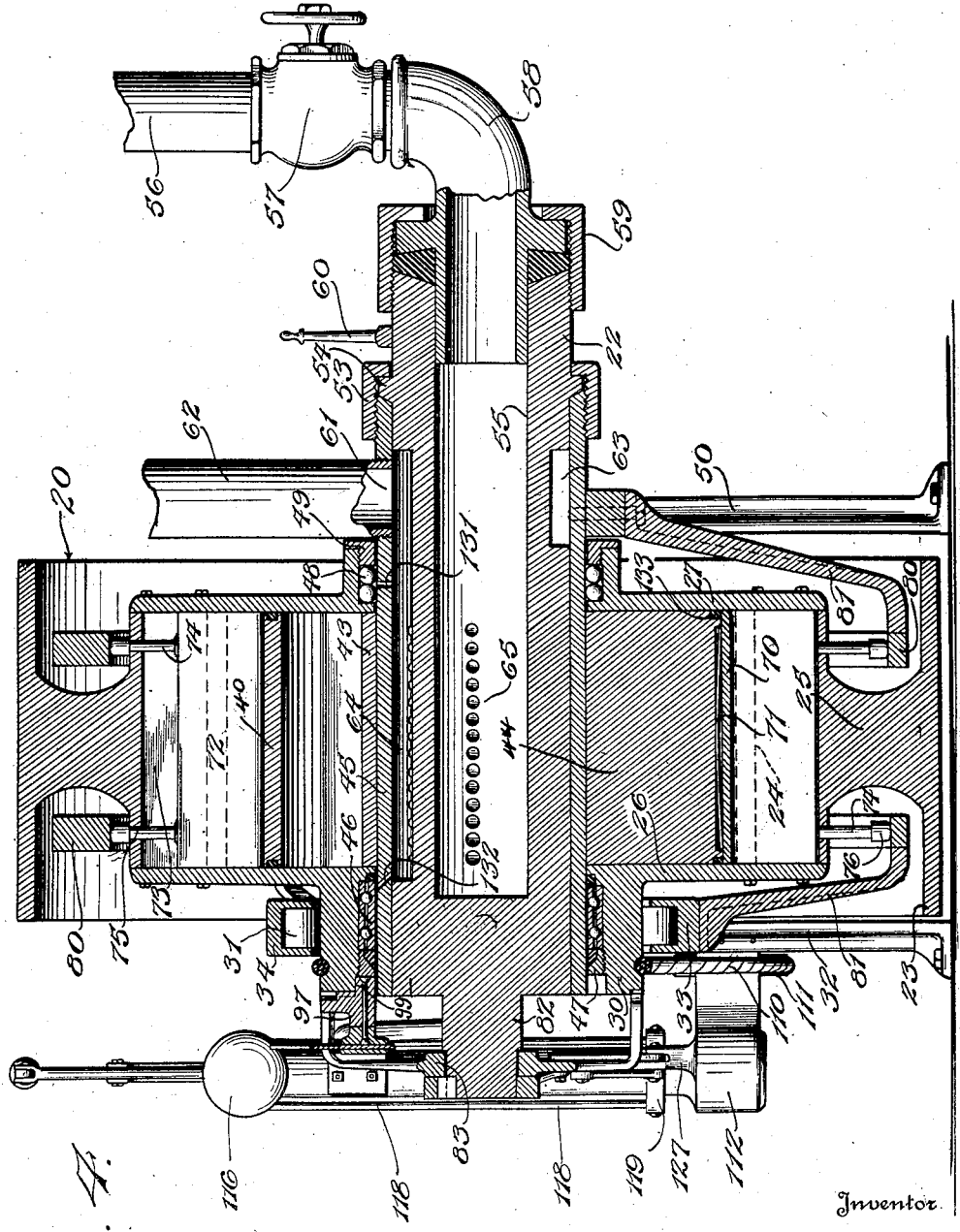

Dec. 9, 1924. 1,518,812
C. J. OLSON
ROTARY ENGINE
Filed Dec. 7, 1922    7 Sheets-Sheet 5
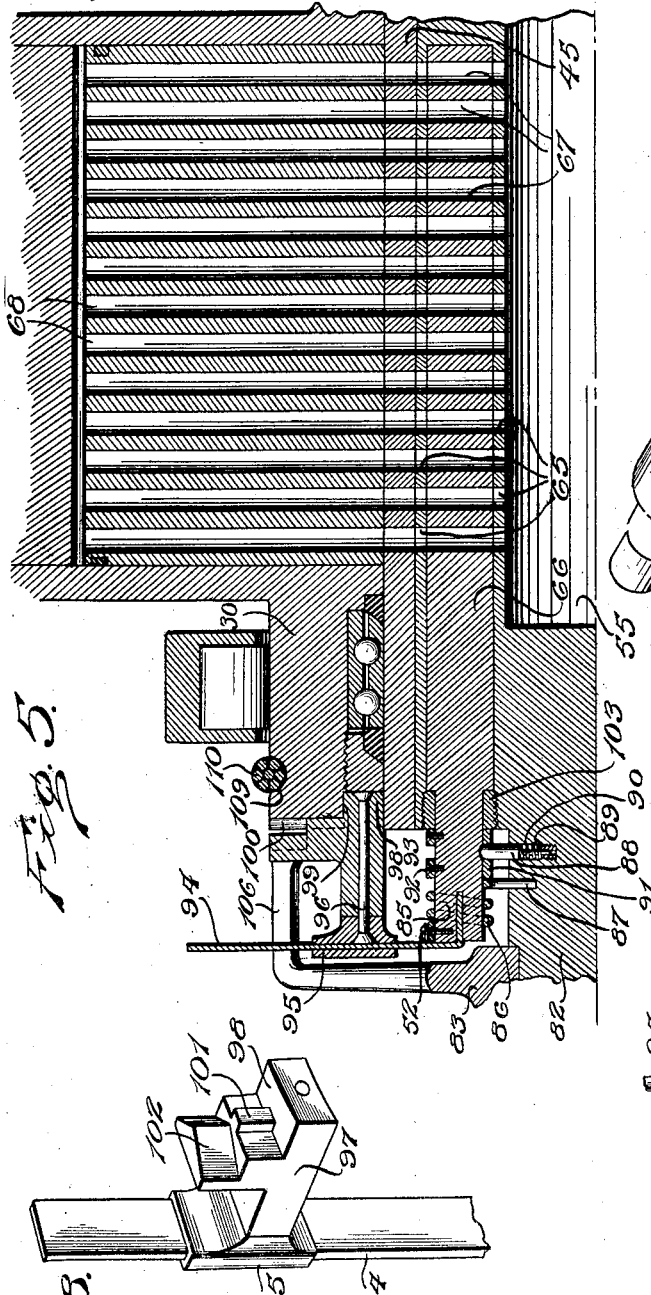
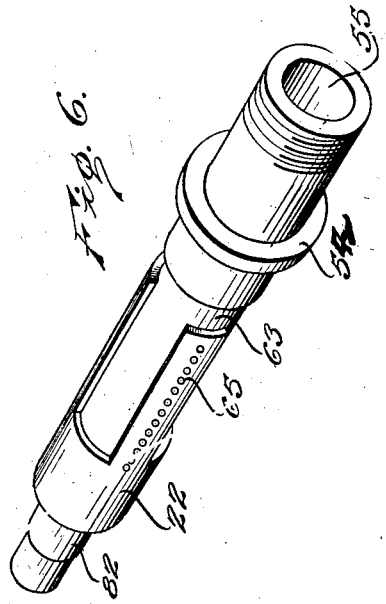
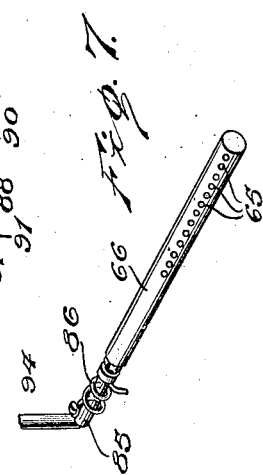
Inventor
Charles J. Olson
By
Larry T Lacey, Attorneys Dec. 9, 1924.
C. J. OLSON
ROTARY ENGINE
Filed Dec. 7, 1922
1,518,812
7 Sheets-Sheet 6
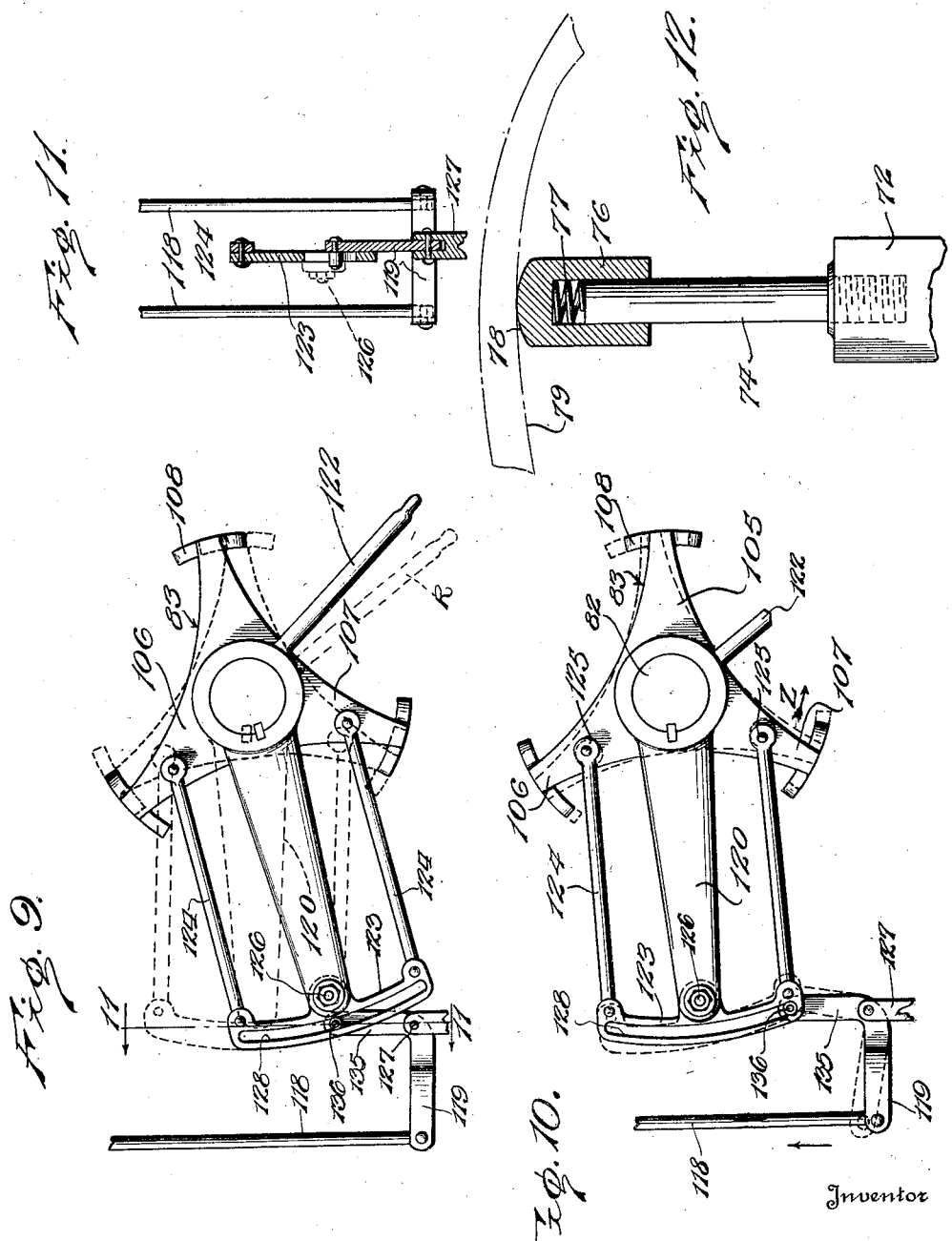
Inventor
Charles J. Olson
By Lacey & Lacey, Attorneys Dec. 9, 1924.
C. J. OLSON
ROTARY ENGINE
Filed Dec. 7, 1922
1,518,812
7 Sheets-Sheet 7
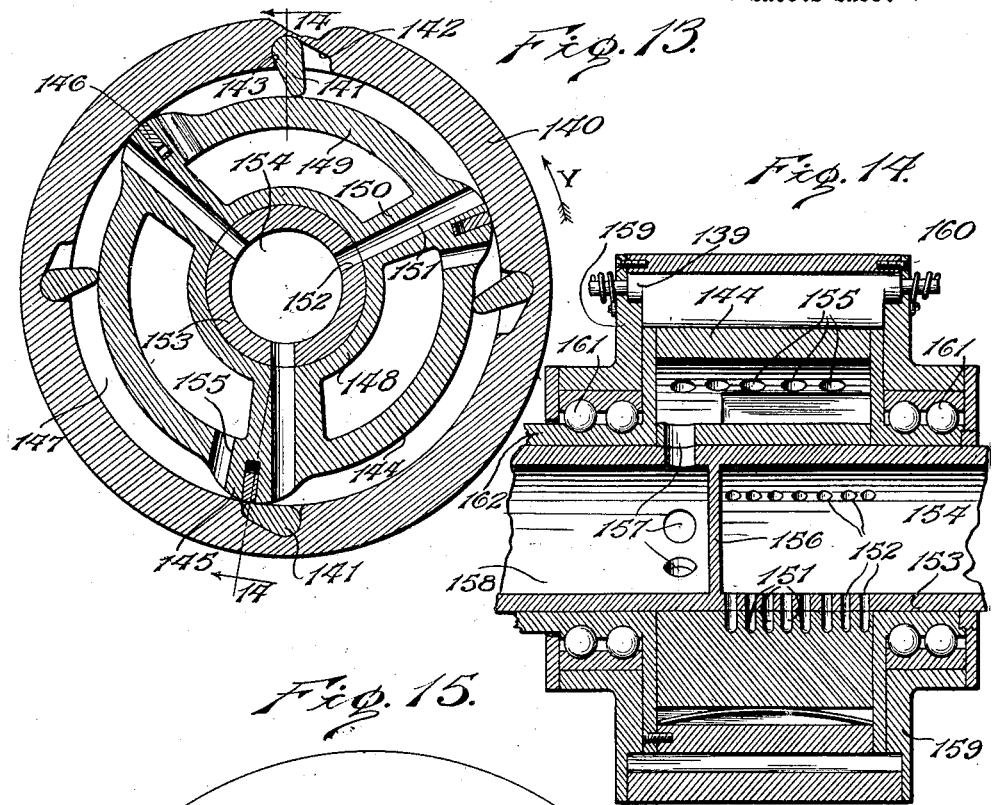
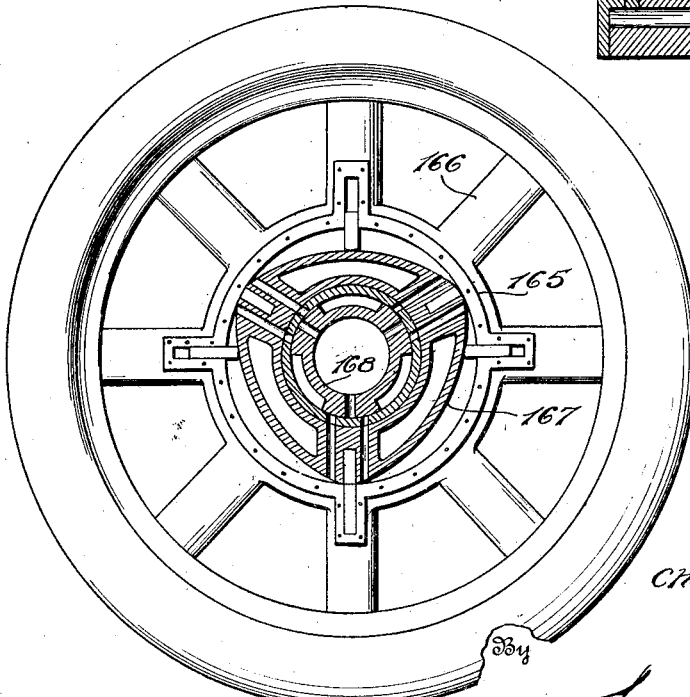
Inventor
Charles J. Olson
By Lacey & Lacey, Attorneys

Patented Dec. 9, 1924.

1,518,812

UNITED STATES PATENT OFFICE.

CHARLES J. OLSON, OF MUSKEGON, MICHIGAN.

ROTARY ENGINE.

Application filed December 7, 1922. Serial No. 605,399.

*To all whom it may concern:*

Be it known that I, CHARLES J. OLSON, a citizen of the United States, residing at Muskegon, in the county of Muskegon and State of Michigan, have invented certain new and useful Improvements in Rotary Engines, of which the following is a specification.

The present invention relates to rotary engines and more particularly to that class of engines having radially slidable pistons projecting across fluid spaces formed between the rotor and the stator and adapted to retreat into the rotor when approaching abutments formed on the latter.

The main characteristics of the engine consist of a cylindrical rotor surrounding the stator or distributor, the latter being preferably of triangular cross section with arched sides and having a central hub portion forming a chamber, in which the main valve is revolubly mounted. This main valve is centrally bored for admitting the pressure fluid used for the motor, the main valve as well as the stator being provided with suitable passages connecting the central bore with the fluid spaces. The main valve is also provided with a number of cutoff valves in order to regulate the supply of pressure fluid for the fluid spaces.

Another object of the invention is to construct the engine as simply as possible, so that the machining necessary will consist mainly in boring, drilling and turning, which requires very little, if any, finishing work.

The engine is specifically designed to use steam as motive power and the invention may be applied both to stationary and portable engines as well as for other uses, such as emery grinders, polishing wheels, spur gears, vehicle wheels, and electric generators.

The engine may be reversible or nonreversible and is driven from within itself and, having no dead center, it can be started from any position, where it had previously stopped. Between the moving parts are inserted ball or roller bearings to eliminate friction as much as possible.

In the accompanying drawings the power wheel or engine has been illustrated as using steam as motive power, and Figure 1 represents a side elevation of the preferred construction of the engine;

Figure 2 is a top plan view with some of the parts removed;

Figure 3 is a vertical section along line 3—3 of Figure 2;

Figure 4 is an axial, vertical section along line 4—4 of Figure 3;

Figure 5 is a radial section of larger scale, along line 5—5 of Figure 3;

Figures 6, 7 and 8 are perspective views of some of the details;

Figure 9 is a side elevation of the cut off mechanism for the valves when the engine is at rest;

Figure 10 is a similar view to Figure 9 with the parts in a different or reversing position;

Figure 11 is a vertical section along line 11—11 of Figure 9;

Figure 12 is a fragmentary side elevation and partial section of the pistons;

Figure 13 is a transverse vertical section of a slightly modified construction of the power wheel used as an emery wheel or spur gear;

Figure 14 is a section along line 14—14 of Figure 13;

Figure 15 is a side elevation in partial section of the engine used as a drive wheel for an automobile.

Figure 1:
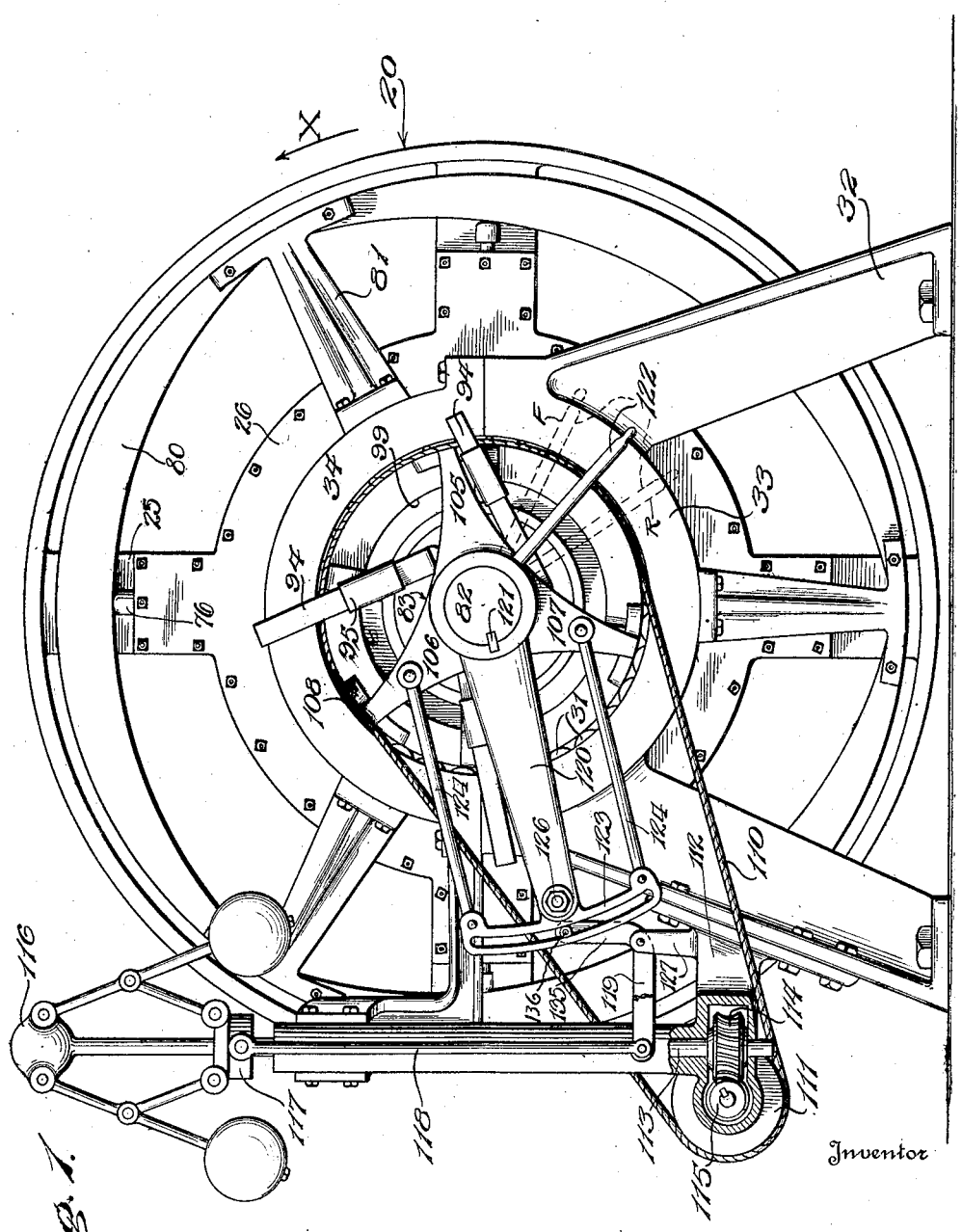

Referring particularly to Figures 1, 2, 3 and 4 of the drawings, the engine is shown constructed of three main parts, namely: the cylindrical rotor 20, the stator 21, of triangular cross section and enclosed in the rotor, and the main valve 22 carried axially and revolubly in the stator 21.

The rotor consists of a thin outer cylinder 23 and a thin inner cylinder 24 spaced therefrom and mounted concentrically therein, by means of radial arms 25. The cylinders 23 and 24 are open at both ends and the smaller cylinder is adapted to be closed by means of a front head 26 and a rear head 27, which are securely bolted or in any other suitable manner held tightly against the ends of the inner rotor cylinder 24. As best seen in Figure 4 the inner cylinder 24 is considerably shorter than the outer cylinder 23, so that the end edges of the latter project an equal distance beyond each end of the inner cylinder 24. The two cylinders 23 and 24, together with the radial arms 25 are preferably made in one casting, and it will now be noted that between the two cylinders and the radial arms are four large openings 28, running in the axial direction of the cylinders, the radial arms 25 being four in number and equally spaced. It is evident that a smaller or greater number of these arms may be used, but with a triangular distributor or stator 21, four of these arms are preferred, or in other words, the number of these arms should be one greater than the number of sides in the distributor or stator 21.

The front head 26 is provided with a hub 30 extending outwardly therefrom, and carried in roller bearings 31 mounted in a stand 32, which, for this purpose, has a lower bearing part 33 closed by a bearing cap 34 in the usual manner.

The distributor or stator 21 has three arcuate outer walls 40, which are spaced away from the inner side of the small cylinder 24, while the ends of the arcuate walls 40 meet to form abutments 41 at the inner periphery of the cylinder 24, as best seen in Figure 3. In this manner three steam spaces 42, of equal size, are formed between the rotor and the distributor or stator. The center portion of the distributor or stator consists of a hollow cylinder 43 of the same length as the inner rotor cylinder 24 and the walls 40. Connecting the hollow cylinder 43 with the arcuate walls 40 are radial arms 44 running in the direction of each abutment 41 of the distributor or stator. Within the hollow cylinder 43 and rigidly secured thereto or formed integral therewith is a cylindrical sleeve or lining 45, which extends in an axial direction beyond the ends of the distributor or stator and is preferably level with the outer end of the hub 30 of the rotor. At this end is furnished a ball-race 46 supporting the sleeve 45 in the hub 30, and a packing box 47 closing the opening formed in the hub for the ball-race.

The rear cap 27 of the rotor is also provided with a ball-race 48 and a packing box 49, so that at this end the rotor, through the intermediary of its rear head 27 and the ball-race 48, is actually supported on the sleeve 45, the latter extending beyond the end of the rear head 27 and being secured in the rear stand 50, by bolts or the like.

In this sleeve 45 is revolubly mounted and co-axial therewith and with the distributor or stator and the rotor, the main valve 22. This valve is constructed in the form of a shaft with a hollow chamber 55, open at the rear end of the valve. When the sleeve 45 and the main valve 22 form different parts, they are rigidly clamped together by means of a cap 53 threaded on the end of the sleeve 45 and engaging over a collar 54 on the main valve 22. This end forms the inlet for the steam from the steam supply 56 through the steam valve 57, communicating through the elbow with the chamber 55 of the main valve 22. A packing box 59 is formed around the end of the elbow to hold the same tightly on the main valve 22, while permitting a slight rotation between the elbow and the valve 22. A controlling lever 60 is secured on the main valve 22 for turning the same in the sleeve 45.

Adjacent the rear end of the sleeve 45 is an exhaust port 61 provided with an exhaust pipe 62, and an annular groove 63 is formed around the main valve, registering at all times with the exhaust port 61. In the longitudinal direction of the outer side of the main valve 22 are also formed exhaust passages 64 extending all the way to the opposite end of the distributor or stator 21. A series of port holes 65 running in radial direction from the chamber 55 to the outer periphery of the main valve 22, are arranged in three groups, as best seen in Figure 3, 4 and 5. Across each of said groups of port holes a cut-off valve 66 is inserted in the longitudinal direction of the main valve 22. These cut-off valves are drilled with port holes 67 corresponding with the port holes 65 in the main valve 22 and the cut-off valves 66 are mounted to turn in the main valve, independent of the latter, so as to completely or partially, cut off the steam supply from the steam chamber 55. As best seen in Figures 3 and 5, inlet and exhaust passages 68 and 69 are furnished in the radial arms 44 of the distributor or stator 21 and these passages are arranged in two parallel groups in each radial arm 44, so that, as seen in Figure 3, the passages 68 serve as inlets for the steam into the steam spaces 42, while the passages 69 serve for the exhaust of the steam from the spaces 42 into the grooves 64 and the exhaust ports 61, with the rotor running in the direction of the arrow X. Depending on the position of the main valve 22, with regard to these passages, the latter may serve alternately as intake and exhaust passages, as will be readily understood by reference to Figure 3, and in this manner the running of the engine can be reversed.

Along each abutment 41 of the distributor or stator 21 is inserted a packing strip 70, held yieldably against the inner periphery of the cylinder 24 of the rotor, by means of springs 71, see particularly, Figure 4.

Arranged within the radial arms 25 and extending in the radial direction thereof, are slidably mounted pistons 72, the detailed construction of which is shown in Figures 3, 4 and 12. Each of these pistons consists of a thin, flat piece of metal extending between the two caps 26 and 27 and mounted in a corresponding recess 73 in the radial arm 25. Each piston has a pair of shanks or guide rods 74, which engage in suitable apertures 75 through the cylinder 24. The extreme ends of these shanks 74 each carry a cap or nipple 76, which contains a coil spring 77 tending to push the caps and shanks apart in the longitudinal direction of the shanks. The outer end face 78 of each cap, which is rounded, engages the inner surface 79 of the cams 80, which are placed one on each side of the rotor, symmetrically, as regards the radial arms 25, as seen in Figure 4. The cam surfaces 79 are parallel with the arched surfaces of the distributor or stator 21, so that the radial distances between them is constant. This arrangement is intended to keep the inner rounded surface of the piston 72 always in contact with the arched surfaces of the distributor or stator, so that the action of the cam surfaces 79, through the caps 76 and the springs 77 against each piston 72 will always hold the pistons tightly against the distributor or stator independent of any unevenness of the surfaces. The cams 80 are carried rigidly by means of arms 81 upon the stands 32 and 50, as best seen in Figure 4.

The front end of the main valve 22 is reduced to form a journal 82, upon which is revolubly mounted a spider 83, the function of which will be described later.

Around the reduced end 85 of each cut-off valve 66 is wound a coil spring 86, secured to the valve as at 52, and at its other end to the journal 82, as at 87. This spring tends to turn the valve 66 in the direction to close the inlet ports 65 in the main valve, thus holding valve 66 yieldably in that position. In order to lock the cut-off valve 66 in closed position a plunger 88 is provided, seated in the radial recess 89 in the journal 82 and pushed outwardly by means of a coil spring 90, so as to contact with the surface of the reduced portion 85 of the cut-off valve 66. A ring 91 is slipped over the reduced portion 85 of the cut-off valve 66 and is held by means of screws 92. This ring has notches 93 adapted to engage with the plunger 88 in its open and closed positions respectively. A retaining sleeve 103, threaded in the journal 82 retains the valve 66 in axial direction.

In the end of the reduced portion 85 of the cut-off valve 66 is inserted a flexible arm 94, by means of which the turning of the cut-off valve 66 is effected. This flexible arm 94 engages in a sleeve 95 slidably carried thereon and on a pin 96 secured in the sleeve 95 is journaled a block 97 permitting oscillation of the block, as regards the sleeve 95. This block has a projecting nose 98 adapted to engage in an annular groove 99 furnished in the hub 30 of the front head. From the annular groove 99 radial slots 100 run to the outer periphery of the hub. These slots are adapted to intermittently engage a rib 101 furnished on the inner side of the block 97 and above the nose 98. The slots 100 are of the same number as the pistons 72 in the rotor, so that in the example illustrated in the drawings, four of these slots 100 have been shown. The depth of the slots 100 is less than the depth of the annular groove 99, so that, while the nose 98 is constantly engaged in the groove 99, the rib 101 is only temporarily engaged in the slot 100. A V-shaped cam 102 is also formed on the block 97 above the rib 101. This cam has two sloping sides joined at the apex along a central plane, through the axis of the block 97, as best seen in Figure 8.

The spider 83 has three legs 105, 106 and 107 spaced 120 degrees apart and extending outwardly in radial direction, so as to stand in the path of each of the flexible arms 94, as seen in Figures 1, 4 and 5. Each of these arms has a wide foot 108 reaching out circumferentially to both sides of the corresponding leg. This foot 108 is adapted to engage with the cam 102 in a certain position of the parts and in this manner lift the rib 101 of the block 97 out of the slot 100, so that instead of the block being locked by this slot it will be permitted to slide around the end surface of the hub 30, while the nose 98 still engages in the groove 99.

Near the end of the hub 30 is formed an annular groove 109 adapted to receive an endless belt or wire rope 110 running on a small pulley 111, revolubly carried in a bracket 112 secured on the front stand 52, which bracket also forms a bearing for a spindle 113, see Figures 1 and 5. This spindle has a worm wheel 114 keyed thereon and a worm 115 rigidly connected with the pulley 111 meshes with the worm wheel 114, so as to revolve the spindle 113 in synchronism with the rotor 20. On the upper end of the spindle is carried a governor 116 of any suitable construction having a slidable collar 117 adapted to be lifted along the spindle 113 when the balls of the governor 116 fly out at increased speed of the spindle and the rotor 20. A pair of links 118 connect this collar with a bell-crank 119.

At the end of the journal 82 on the main valve, is a shifting arm 120 keyed thereon, as at 121, so as to cause the main valve to revolve with the arm when the latter is swung around the axis of the valve. A second controlling lever 122 is also secured to this journal 82 of the hub and preferably attached, as in Figure 1, to the boss of the shifting arm 120. At the end of the shifting arm 120, see Figures 1, 9, 10 and 11, a two-armed link 123 is journaled, as at 126, at the free ends of which connecting rods 124 are journaled. The other ends of the connecting rods 124 are hinged, as at 125, to the legs or prongs 106 and 107 respectively, of the spider 83. On the bracket 112 is a bearing 127 in which is journaled a bell crank 119, one arm of which connects with the links 118 while its other arm 135, which carries a guide block or roller 136, engages with the arcuate slot 128 of the link 123.

At the rear end of the main valve 22 and preferably adjacent the controlling lever 60, is an indicator consisting of a pointer 129, see Figure 2, secured on the main valve 22, so as to turn with the same. This pointer extends over the cap 53, so as to register with the scale 130 on the sleeve 45, or if more convenient, with a scale placed on the rear stand 50. This scale has a "zero" mark for the central or closed position of the valve 22. The scale has also a "forward" mark F, and a "reverse" mark R, indicating in which direction the valves should be turned for starting or reversing the motor respectively.

The valve can be turned by either one of the controlling levers 60 or 122, so that the operator can start or stop the motor whether standing in front or rear thereof. This is of great importance as in case of accidents, it might be necessary to reach the controlling lever quickly and in this case the operator would not have to run from one end of the motor to the other to stop the same, but can do so by reaching the nearest one of the controlling levers 60 or 122.

In Figures 13 and 14 a simplified form of power wheel is illustrated, the rotor 140 in this case being suitable to use as a grinding wheel, spur wheel, vehicle wheel or the like. As previously described, the rotor is cylindrical, but instead of having pistons sliding radially in the rotor, they are here shown mounted to oscillate therein. For this reason four pistons 141 are provided, seated in pockets 142, of such a shape, that the half-cylindrical back of each piston can turn therein and be folded down in its pocket, as seen at the bottom of Figure 13, or stand in semi-radial direction, as seen at the top and sides thereof, sustained by the wall 143 of its pocket. Each piston is provided with a pair of trunnions 139, with which coil springs 138 engage, tending to hold the pistons in semi-radial position.

The distributor or stator 144 is provided with three abutments 145, in which are inserted yieldable packings 146, forming tight joints between the abutments and the inner periphery of the rotor 140. In this manner three steam spaces 147 are formed as before. The distributor or stator 144 has a central cylindrical portion 148 connected with the outer portion 149 thereof by means of radial arms 150. In the radial direction of these radial arms are bored a series of inlet posts 151, which are adapted to communicate with corresponding posts 152 in the main valve 153, which is revolubly mounted within the cylindrical portion 148 of the distributor or stator. With the parts in the relative position indicated in Figures 13 and 14 the steam chamber 154 formed in the valve 153 communicates with the steam spaces 147 through the inlet ports 152 and 151. The steam pressure will then act on the rear faces of the oscillating pistons 141 to drive the rotor in the direction of arrow Y, see Figure 13, while the forward sides of the piston drive the used steam ahead thereof, so that it escapes through the port holes 155 on the rear slope of each of the abutments 145. The main valve 153 is preferably partitioned off, as at 156, so that fresh steam is supplied from the chamber 154, while the exhaust steam coming through the exhaust ports 155 passes through other ports 157 into the exhaust chamber 158 formed in the main valve 153.

The open ends of the rotor are closed by suitable heads 159 secured by screws 160 or the like. The heads 159 are preferably mounted on ball bearings 161 carried on bosses 162 formed on the distributor or stator 144.

In Figure 15 is shown a vehicle wheel applied around the power wheel of the kind described in the foregoing, and the rotor 165 is here provided with spokes 166 carrying the rim of the wheel. This rotor is constructed in a similar manner to what has been described in connection with Figures 1 to 5, as has also the distributor or stator 167 and the main valve 168, so that no further description of this wheel is necessary. The operation of the power wheel, as described and shown in connection with Figures 1 to 12 is as follows:

Supposing the rotor is at a standstill, that is to say, the main valve 22 has the central position indicated by the pointer 129, registering with the zero mark on the scale 130, see Figure 2. Then the ports 65 of the main valve stand midway between the ports 68 and 69 in the sleeve 45, and in the distributor or stator 21, so that all communication between the steam chamber 55 and the steam spaces 42 is closed. The inlet valve 57 will now be opened to admit steam or compressed air into the chamber 55 in the main valve, whereupon the latter is turned, by means of the levers 60 or 122, into the dotted position of the latter indicated by letter "F" in Figure 1, with the pointer registering "forward" on the scale 130, in case the rotor is intended to run in the direction of arrow X. The cut-off valves 66 will then stand in the relation indicated in Figure 3, admitting steam from the chamber 55 through the ports 65, 67 and 68 into the steam spaces marked A and B in this figure, while the steam spaces marked C will have no steam supply at the present moment. The steam confined in the spaces A and B between the adjacent abutments 41 and the pistons 72 will now act on the rear face of the latter to drive the rotor 20 in the direction of the arrow X, see Figure 3. The rotor will continue to revolve, actuated by the pressure on the two pistons of the rotor until the third piston has passed over the present inlet ports 68, when the latter piston will take the pressure and the pressure on the first piston is released directly the same has passed the exhaust ports 69 at the moment the piston leaves the steam space A. The steam is then exhausted through the ports 69 into the channels 64 formed in the main valve 22 and through the annular groove 63, out through the exhaust port 61 and the pipe 62, see Figures 4 to 6.

As there are four pistons and three sets of inlet and exhaust ports, there will always be two or three pistons upon which the steam pressure will act, while only one passes a neutral point. Accordingly, the rotor can be started in either direction from where it stands, upon the pressure being turned on. The steam supply is governed by the three cut-off valves 66 actuated by the governor 116, which may be of any suitable type, but preferably of the usual ball-gravity type and connected to this valve as previously explained.

When the rotor is at a standstill and the main valve turned off, the arm 120 and the spider 83 take the position indicated by the full lines in Figures 1 and 9, while when the valve is turned to admit steam through the ports 68 to revolve the rotor 29 in the direction of the arrow X in Figure 3, then the parts take a position opposite to that shown in dotted lines, Figure 9 and in full lines, Figure 10. That is to say, with the lever 122 turned up to "F", Figure 1, the top end of slot 128 descends to the guide block 136. As the rotor revolves, the slots 100 at the time engage the ribs 101 of the blocks 97 carrying the flexible arms 94 with them, thereby turning the cut-off valves 66 gradually into open position.

As the rotor speeds up, the governor 116 is driven synchronously therewith by a belt 110 and intermediary gearing 114 and 115. Its balls will then swing apart and raise the outer end of the horizontal arm of the bell-crank 119 through the intermediary of the links 118. Through the action of the bell-crank arm 135 and the guide block 136 on the link 123, the connecting rods 124 will then turn the spider 83 around the hub 82 of the rotor, independent of the position of the arm 120 and in clock-wise direction, in Figure 1.

When the flexible arm 94 attached to that one of the cut-off valves 66, which is situated at the bottom of the main valve 22 in Figure 3, has been swung to close under the leg 105 of the spider 83, the cam 102 of the block 97 rides up on the foot 108 of this leg 105 until the rib 101 disengages the slot 100, and the block 97 and the flexible arm 94 are set free, when the flexible arm 94 will be swung back, actuated by the coil spring 77 to turn this particular cut-off valve into closed position momentarily, while the piston 72 at the bottom of the rotor, see Figure 3, passes the apex of the abutment 41 at this point, so that no steam can enter the space C at this time.

It will now be evident that the foot 108 of the spider 83 will engage with the cams 102 of the blocks 97, thereby disengaging the ribs 101 from the slots 100 earlier in the cycle of operations, thereby cutting off the steam from the steam chamber 55 to the spaces 42. The speed of the rotor 20 will accordingly be slower and the governor 116 will gradually lower its balls until the parts again take the normal position for forward running. Shortly after each arm has been swung back to close each respective cut-off valve 66 in this manner, the rib 101 will again engage the slot 100, so that the block 97 with the arm 94 will be carried in the direction of rotation to gradually open the ports 65 and instantly again close them, as soon as the cam 102 engages with the foot 108 of the spider 83.

To reverse the direction of the rotor 20, one of the levers 60 or 122 is turned to the dotted position "R" of the latter in Figures 1 and 9 or the full line position in Figure 10, so that the pointer 129 registers with the reversing mark R on the scale 130, see Figure 2, whereupon the ports 65 will register with the ports 69 in the distributor or stator 21 to admit steam into the spaces 42, when the pressure will act on the opposite faces of the pistons 72 and revolve the rotor 20 in opposite direction to the arrow X, see Figure 3, and turn the spider 83 in direction of arrow Z in Figure 10, when the governor deflects its balls.

In order to stop the wheel, the main valve 22 is merely turned, so that the pointer 129 registers with the zero mark on the scale 130, when the ports 65 will stand midway between the ports 68 and 69 in the distributor 21.

No governor will be necessary in connection with the vehicle wheel shown in Figure 15 or the grinding or gear wheels shown in Figure 13, as the speed will be regulated by a throttle valve for the steam supply.

The operation of the power wheels indicated in Figures 13, 14 and 15 will be clear from the foregoing description. It will be evident however that the vehicle wheel indicated in Figure 15, can be turned in either direction, while wheels of other character, shown in Figures 13 and 14 intended for gear wheels or grinding wheels, can only be turned in one direction, as indicated by the arrow Y in Figure 13.

Instead of having the moving pistons in the rotor, it may, at times, be desirable to place them in the distributor or stator in which case the latter would naturally be cylindrical and the steam space formed in the rotor instead, reversing the conditions indicated in Figure 3.

At 131 and 132 in Figure 4 are shown vents for passing out steam or other pressure fluid that might have collected in the bearings. Similar vents may be provided for the same purpose in other parts of the power wheel, in this manner saving the bearings or electric wiring from injury.

Packing strips are furnished whenever needed to allow for wear and expansion and to prevent leakage, as for instance at the ends of the distributor indicated at 133.

Having thus described the invention, what is claimed as new is:

1. A rotary engine comprising a stationary and a revoluble member, mounted one within the other, one of said members having fixed abutments and the other of said members having yieldably mounted piston; a valve revolubly mounted in the inner one of said members and coaxially therewith, said inner member and said valve having corresponding ports adapted to register with each other when said valve is set for admitting pressure fluid to operate the engine and similarly arranged exhaust passages for spent fluid, cut-off elements for said ports, and means for operating said elements; said means including arms on said cut-off elements engaging with said revoluble member for swinging the arms in one direction, springs opposing said swinging, and a separate element adapted to break said engagement.

2. A rotary engine comprising a stationary and a revoluble member, mounted one within the other, one of said members having fixed abutments and the other of said members having yieldably mounted pistons; a valve revolubly mounted in the inner one of said members and coaxially therewith, said inner member and said valve having corresponding ports adapted to register with each other when said valve is set for admitting pressure fluid to operate the engine and similarly arranged exhaust passages for spent fluid, said valve having a central chamber connected with a source of pressure fluid, said chamber communicating with said valve ports, cut-off elements for said ports, and means for operating said elements; said means including arms on said cut-off elements engaging with said revoluble member for swinging the arms in one direction, springs opposing said swinging, and a separate element adapted to break said engagement.

3. A rotary engine comprising a stationary and a revoluble member mounted one within the other, one of said members having fixed abutments and the other of said members having yieldably mounted pistons; a valve revolubly mounted in the inner one of said members and axially therewith, said inner member and said valve having corresponding ports adapted to register with each other when said valve is set for admitting pressure fluid to operate the engine and similarly arranged exhaust passages for spent fluid, said valve being adapted to pass the spent fluid from said passages to the atmosphere, cut-off elements for said ports, and means for operating the said elements; said means including arms on said cut-off elements engaging with said revoluble member for swinging the arms in one direction, springs opposing the said swinging, a separate element adapted to break said engagement when contacting with said arms, the position of said separate element being adjustable.

4. A rotary engine comprising a rotor, a stator having distributing passages for pressure fluid, said rotor being provided with a bore, within which said stator is housed, abutments on said stator contacting with the surface of said bore, the contour of the stator being such that crescent-shaped fluid spaces extending between said abutments are formed between the bore surface of the rotor and said stator, piston yieldably mounted in said rotor, a valve member revolubly mounted in the stator and coaxially with said rotor, said valve member having ports adapted to connect said passages simultaneously with a pressure fluid source, said valve member being also provided with exhaust channels adapted to connect others of said passages simultaneously with the atmosphere, the number of said pistons being greater than the number of said abutments, cut-off elements in said valve member for said ports, means for operating said cut-off elements, said means including arms on said cut-off elements, said arms having engagement with said rotor for swinging the arms in one direction, springs tending to turn said arms in the opposite direction and a spider adapted to break said engagement when contacting with said arms.

5. A rotary engine comprising a rotor, a stator having distributing passages for pressure fluid, said rotor being provided with a cylindrical bore, within which said stator is housed, abutments on said stator contacting with the surface of said bore, the contour of the stator being such that crescent-shaped fluid spaces extending between said abutments are formed between the bore surface of the rotor and said stator, pistons yieldably mounted in said rotor, a valve member revolubly mounted in the stator and coaxially with said rotor, said valve member having ports adapted to connect said passages simultaneously with a pressure fluid source, said valve member being also provided with exhaust channels adapted to connect others of said passages simultaneously with the atmosphere, the number of said pistons being greater than the number of said abutments, cut-off elements in said valve member for said ports, means for operating said cut-off elements, said means including arms on said cut-off elements, said arms having engagement with said rotor for swinging the arms in one direction, springs tending to turn said arms in the opposite direction and a spider adapted to break said engagement when contacting with said arms, the position of said spider being adjustable.

6. A rotary engine comprising a rotor, a stator having distributing passages for pressure fluid, said rotor being provided with a cylindrical bore, within which said stator is housed, abutments on said stator contacting with the surface of said bore, the contour of the stator being such that crescent-shaped fluid spaces extending between said abutments are formed between the bore surface of the rotor and said stator, pistons yieldably mounted in said rotor, a valve member revolubly mounted in the stator and coaxially with said rotor, said valve member having ports adapted to connect said passages simultaneously with a pressure fluid source, said valve member being also provided with exhaust channels adapted to connect others of said passages simultaneously with the atmosphere, the number of said pistons being greater than the number of abutments, cut-off elements in said valve member for said ports, means for operating said cut-off elements, said means including arms on said cut-off elements, said arms having engagement with said rotor for swinging the arms in one direction, springs tending to turn said arms in the opposite direction, a spider adapted to break said engagement when contacting with said arms and a governor actuated by said rotor and associated with said spider for adjusting its position with relation to said arms.

7. A rotary engine comprising a rotor, a stator having distributing passages for pressure fluid, said rotor being provided with a cylindrical bore, within which said stator is housed, abutments on said stator contacting with the surface of said bore, the contour of the stator being such that crescent-shaped fluid spaces extending between said abutments are formed between the bore surface of the rotor and said stator, pistons yieldably mounted in said rotor, a valve member revolubly mounted in the stator and coaxially with said rotor, said valve member having ports adapted to connect said passages simultaneously with a pressure fluid source, said valve member being also provided with exhaust channels adapted to connect others of said passages simultaneously with the atmosphere, the number of said pistons being greater than the number of said abutments, cut-off elements in said valve member for said ports, means for operating said cut-off elements, said means including arms on said cut-off elements, said arms having engagement with said rotor for swinging the arms in one direction, springs tending to turn said arms in the opposite direction and a spider adapted to break said engagement when contacting with said arms, the position of said spider being adjustable, and projections on said arms to form said engagement, corresponding slots being provided for said projections on said rotor.

8. A rotary engine comprising a rotor, a stator having distributing passages for pressure fluid, said rotor being provided with a bore within which said stator is housed, abutments on said stator contacting with the surface of said bore, the contour of the stator being such that substantially crescent shaped fluid spaces are formed between the bore surface of the rotor and said stator and extending between said abutments, pistons in said rotor, and a valve member revolubly mounted in the stator coaxially with said rotor, said valve member being adapted to simultaneously connect all of said passages with a fluid pressure source, said stator having fixed cams, said pistons adapted to be actuated by said cams; cut-off elements adapted to regulate said valve connection, means for operating said elements, said means including arms on said cut-off elements engaging with said revoluble member for swinging the arms in one direction, springs opposing said swinging, and separate elements adapted to break said engagement.

In testimony whereof I affix my signature.

CHARLES J. OLSON. [L. S.]